Patented June 2, 1936

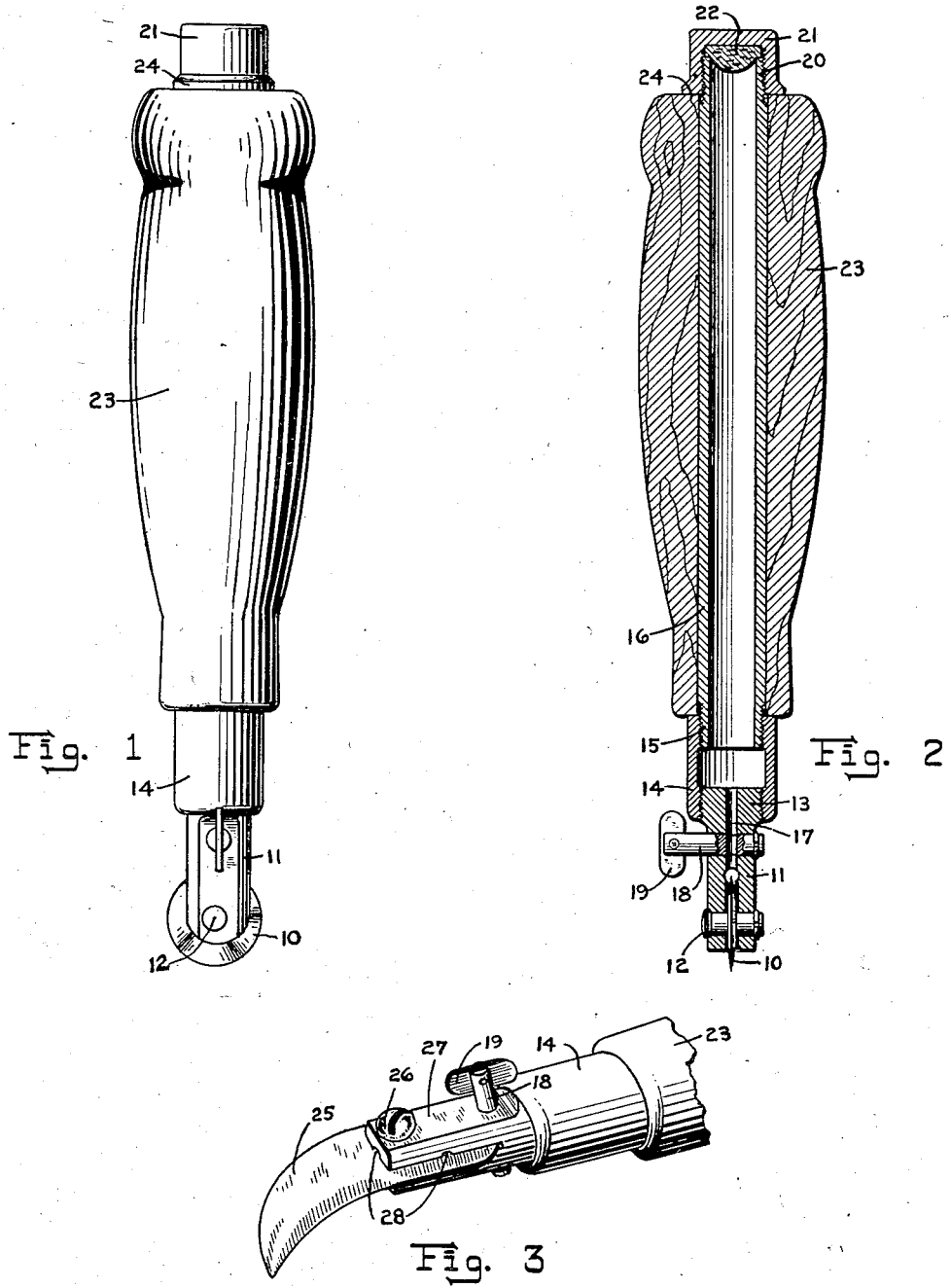

2,042,965

UNITED STATES PATENT OFFICE 2,042,965

CUTTING IMPLEMENT

Nelson J. Rivard, Milford, Conn.

Application September 18, 1934, Serial No. 744,521

8 Claims. (Cl. 164—84)

This invention relates to a cutting implement, and has for its prime object the continuous supply of a fluid to the blade of such an implement while in use.

In many uses of cutting implements it is desirable that the blade be maintained in a moistened or lubricated condition. The cutting of rubber for example is facilitated by the presence of moisture on the blade, while for substances comprising gummy or resinous materials an oil is desirable. Prominent among the latter class are various types of composition roofing, which comprise asphalt or petroleum residues having a strong tendency to adhere to and "gum" the blade.

It is the object of the present invention to obviate these difficulties by providing a fluid supply adjacent to the blade and preferably contained in the handle of the implement, with means for delivering such fluid to the blade at a rate which is proportional to the amount of use thereof.

In the drawing:

Fig. 1 is a side elevation of one form of knife or cutting implement comprising a typical embodiment of the invention.

Fig. 2 is a substantially central section through the implement shown in Fig. 1.

Fig. 3 is a fragmentary perspective view of an implement provided with a different type of blade or cutter.

Referring to Figs. 1 and 2, there is provided a rotary cutter 10 partially housed in a slot in a supporting piece 11 where it is held on an arbor 12. The supporting piece 11 is preferably so shaped as to expose cutter segments of different widths at the two sides and the end portion thereof, as clearly shown in Fig. 1. Thus the depth of the cut can be varied by alternating the position in which the implement is applied to the work. The arbor 12 is preferably held in place by such means as will permit its ready removal to enable replacement of cutter 10. The cutter supporting piece is integral with or suitably joined to a fluid reservoir contained in the implement handle. As shown in the drawing, the upper end 13 of piece 11 is threaded to receive a threaded coupling or collar 14, which collar likewise receives the threaded end 15 of a tubular reservoir 16. The supporting piece 11 comprises a longitudinal passage 17 terminating in the cutter receiving slot and enabling the movement of lubricant from the reservoir 16 to the cutter 10. A suitable valve or stop-cock 18 having a finger piece 19 may be provided for the purpose of regulating or stopping the flow of fluid from the reservoir 16 when desired. The upper end 20 of reservoir 16 is threaded to receive a closing cap 21, a sealing gasket 22 of cork or other suitable material being interposed between the end of reservoir 16 and cap 21. A handle 23, suitably formed and of any suitable material, surrounds the reservoir 16, being firmly held between the collar 14 and the base 24 of cap 21. The handle 23 may comprise two or more segmental pieces suitably joined or may consist of a single piece bored to receive the reservoir 16.

Fig. 3 illustrates the application of the invention to an implement comprising a fixed blade rather than a rotary cutter. The blade 25 is held by suitable means such as screw 26 in a slotted supporting piece 27 similar to the supporting piece 11 above-described, and similarly joined to a fluid reservoir. The margins of the slot may comprise longitudinal and/or transverse grooves 28 to facilitate distribution of the fluid coming through the passage 17 to the blade surface.

To prepare the implement for use, the valve or stop-cock 18 is closed, the cap 21 is removed, and the fluid chamber 16 is filled with any desired fluid. For roofing or other material comprising asphalt or a tarry substance an oil is preferred. The gasket 22 and cap 21 are then replaced, the gasket sealing the upper end of the reservoir against the admission of air, and the stop-cock 18 is opened. So long as the implement remains undisturbed little or none of the fluid will escape through the passage 17, the opposite end of the chamber being sealed and the passage 17 being of such dimensions as to prevent the simultaneous or intermittent admission of air and escape of the fluid. However, the movement of the implement in ordinary use will effect the flow of a suitable amount of the fluid through passage 17 and to the cutting blade, air for replacing this fluid passing inward through the passage 17. The more constantly or vigorously the implement is used the greater will be the flow of the oil or other fluid through the passage 17, thus a flow proportional to the need is automatically provided.

While the implement has been described with particular reference to its use as a roofer's knife, it is to be understood that it is adaptable to any use wherein the delivery of a lubricating or moistening fluid to the blade while in use is desired.

It is also to be understood that the embodiment of the invention herein described and illustrated in the drawing is typical and representative only, the invention being susceptible of embodiment in many other forms, all falling within the scope of the appended claims.

What is claimed is:

1. A cutting implement comprising a handle, a fluid reservoir contained in said handle, a blade support, a blade held therein, and an unobstructed fluid passage of restricted area through said blade support terminating adjacent said blade.

2. A cutting implement comprising a blade, a blade support, a handle secured to said blade support, a fluid reservoir in said handle, an unobstructed passage of restricted area for gradually delivering fluid from said reservoir to said blade, a filling opening in said reservoir adjacent the free end of said handle, and means for closing said opening against the admission of air.

3. A cutting implement comprising a blade, a blade support, a fluid reservoir secured to said blade support, a handle surrounding said fluid reservoir, and means for securing said handle in place comprising a removable closing cap for said fluid reservoir.

4. A cutting implement comprising a handle, a fluid reservoir contained within said handle, a blade support comprising a fluid passage of restricted area, and a manually operable device for closing said fluid passage.

5. A cutting implement comprising a cutting blade, a restricted passage adapted to deliver a fluid to said blade and communicating with a sealed fluid reservoir whereby the delivery of fluid to said blade is controlled in accordance with the use of the implement.

6. A cutting implement comprising a blade support, a blade secured therein, said support comprising passages for delivering a fluid to the sides of said blade, and a passage for delivering fluid to said first-mentioned passages, said last-mentioned passage communicating with a fluid supply.

7. A cutting implement comprising a cutting blade held in a blade support, a handle secured to said blade support, a fluid reservoir within said handle, an unobstructed restricted fluid passage from said fluid reservoir through said blade support, whereby fluid is delivered from said reservoir to said blade at a rate proportional to the movement of the implement in use.

8. A cutting implement comprising a blade held in a blade support, a fluid passage of restricted area through said blade support, a fluid reservoir secured to said blade support and communicating with said passage, and a handle surrounding said fluid reservoir and secured thereon.

NELSON J. RIVARD.